United States Patent [19]
Fujikawa et al.

[11] Patent Number: 4,628,876
[45] Date of Patent: Dec. 16, 1986

[54] ENGINE BALANCING SYSTEM

[75] Inventors: Tetsuzo Fujikawa, Kobe; Makizo Hirata; Shinichi Tamba, both of Kakogawa; Akio Miguchi, Akashi, all of Japan

[73] Assignee: Kawasaki Jukogyo Kabushiki Kaisha, Japan

[21] Appl. No.: 733,947

[22] Filed: May 14, 1985

[30] Foreign Application Priority Data

May 16, 1984 [JP] Japan .................................. 59-99302

[51] Int. Cl.$^4$ ............................................. F02B 75/06
[52] U.S. Cl. .................................... 123/192 B; 74/604
[58] Field of Search ................. 123/192 R, 192 B, 54; 74/603, 604

[56] References Cited
U.S. PATENT DOCUMENTS 3,520,285  7/1970  Klauder ........................... 123/192 B
4,386,512  6/1983  Rehag et al. ........................... 74/603

FOREIGN PATENT DOCUMENTS 183991    4/1955   Fed. Rep. of Germany .... 123/54 R
2126059  12/1972   Fed. Rep. of Germany ... 123/192 B
2443575   8/1980   France .............................. 123/52 A

OTHER PUBLICATIONS

Evans et al., WO82/01913, 6–1982, pp. 1–20.

Primary Examiner—Charles J. Myhre
Assistant Examiner—David A. Okonsky

[57] ABSTRACT

An engine balancing system for a single-cylinder engine including a single primary balancer and a counterbalancer for reducing rotational vibration, wherein the single primary balancer has an axis of rotation disposed parallel to a crank shaft of the engine and is driven at the same velocity as the crank shaft in a direction opposite to the direction of rotation of the crank shaft. A cylinder of the engine has a center line which deviates from the center axis of the crank shaft and is displaced toward the single primary balancer.

3 Claims, 8 Drawing Figures

ENGINE BALANCING SYSTEM

FIELD OF THE INVENTION

This invention relates to an engine balancing system having a single primary balancer suitable for use with a single-cylinder engine.

DESCRIPTION OF THE PRIOR ART

Referring to FIG. 1, a center line $C_0$ of a cylinder 1 crosses a center $O_1$ of rotation of a crank shaft 3 in a single cylinder engine of the prior art provided with a single primary balancer. The numeral 2 designates the single primary balancer located parallel to the crank shaft 3 and drivenly connected thereto through a pair of gears, not shown, to rotate at the same velocity as the crank shaft 3 in a direction opposite to the direction of rotation of the crank shaft 3.

The engine of the prior art provided with the single primary balancer 2 as shown in FIG. 1 has suffered the disadvantage that a moment about the crank shaft 3 increases, thereby causing an increase in the rotary vibration occurring in a plane perpendicular to the crank shaft 3.

SUMMARY OF THE INVENTION

This invention has as its object the provision of an engine balancing system suitable for use with a single-cylinder engine which is capable of reducing the moment produced about the crank shaft by the single primary balancer, to thereby reduce the rotary vibration occurring in a plane perpendicular to the crank shaft.

According to the invention, the aforesaid object is accomplished by providing an engine balancing system comprising a single primary balancer rotating at the same velocity as the crank shaft in a direction opposite to the direction of rotation of the crank shaft, wherein the single primary balancer is located parallel to the crank shaft and the center line of the cylinder deviates from the center of rotation of the crank shaft and is displaced toward the single primary balancer.

In the engine balancing system according to the invention, the single primary balancer rotating at the same velocity as the crank shaft in a direction opposite to the direction of rotation of the crank shaft is located parallel to the crank shaft and the center line of the cylinder deviates from the center of rotation of the crank shaft and is displaced toward the single primary balancer. By this arrangement, a moment produced about the crank shaft by the single primary balancer is canceled out by a moment produced about the crank shaft by the force of inertia of the reciprocating piston which is oriented in a direction opposite to the direction in which the first-mentioned moment about the crank shaft is oriented. Thus, the rotary vibromotive force acting about the crank shaft is greatly reduced, thereby reducing the rotary vibration occurring in the crank shaft. This is conducive to a marked reduction in vibration at low load.

According to the invention, the need to use two primary balancers is eliminated by deviating the center line of the cylinder from the center of rotation of the crank shaft toward the single primary balancer, to thereby reduce rotary vibration. Particularly, since it is not necessary to use two primary balancers, the invention enables an overall compact size to be obtained in an engine.

DESCRIPTION OF THE PREFERRED EMBODIMENTS

Figure 2:
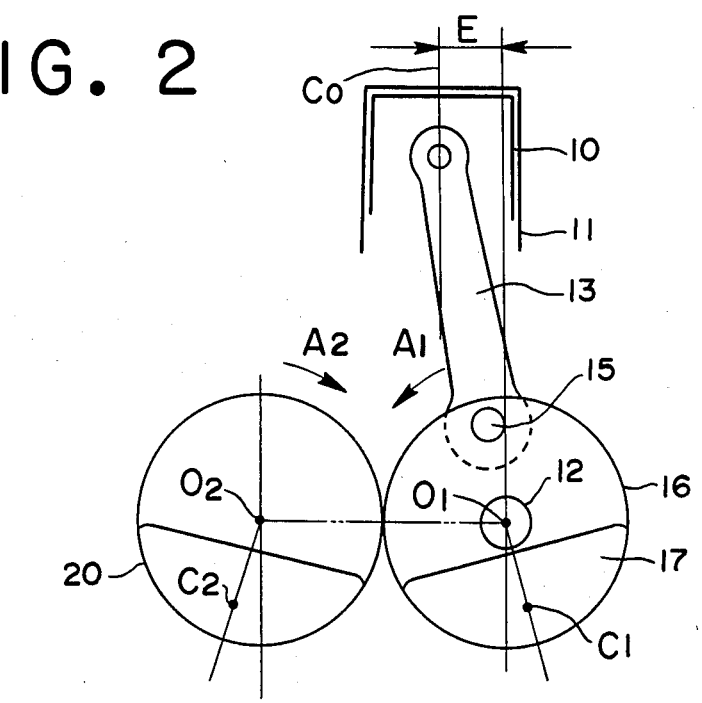
FIG. 2 is a schematic vertical sectional view of the engine in which one embodiment of the invention is incorporated.

Referring to FIG. 2, there is shown an engine of a single-cylinder type incorporating therein one embodiment of the engine balancing system in conformity with the invention. As shown, the engine comprises a piston 10, a cylinder 11, a crank shaft 12 and a connecting rod 13 having a major diameter end portion to which is fitted a crank pin 15 connected through a crank web 16 to the crank shaft 12. The crank web 16 has a counterbalancer 17 formed therein and having a center of gravity $C_1$ which is located with a phase difference of 180 degrees with respect to the crank pin 15.

A single primary balancer 20 which is located parallel to the crank shaft 12 is drivenly connected to the crank shaft 12 through a pair of gears, not shown, and rotates at the same velocity as the crank shaft 12 in a direction opposite to the direction of rotation of the crank shaft 12. More specifically, the crank shaft 12 rotates in the direction of an arrow $A_1$ and the single primary balancer 20 rotates in the direction of an arrow $A_2$. An imaginary line connecting a center $O_1$ of rotation of the crank shaft 12 to a center $O_2$ of rotation of the single primary balancer 20 is perpendicular to a center line $C_0$ of the cylinder 11.

The center line $C_0$ of the cylinder 11 deviates by an amount corresponding to an eccentricity E toward the single primary balancer 20 with respect to the center $O_1$ of rotation of the crank shaft 12.

The single primary balancer 20 has a center of gravity $C_2$ located in a position which is symmetrical in phase with a center of gravity $C_1$ of the counterbalancer 17.

Stated differently, the center of gravity $C_2$ of the single primary balancer 20 and the center of gravity $C_1$ of the counterbalancer 17 are located symmetrically with each other in phase with respect to a vertical plane including a vertical line that bisects the imaginary line connecting together the center $O_2$ of rotation of the single primary balancer 20 and the center $O_1$ of rotation of the counterbalancer 17 and extending perpendicularly thereto.

Referring to FIG. 2 again, the crank shaft 12 rotates at an angular velocity $\omega$ in the direction of an arrow $A_1$ and the single primary balancer 20 rotates at the angular velocity $\omega$ in the direction of an arrow $A_2$ as the piston 10 moves in reciprocatory movement. As each of these mass points inside the engine moves, a rotary vibration is produced in the engine as a whole about its center of gravity in a plane perpendicular to the crank shaft 12. Since the center of gravity of the engine shifts with time and its analysis is a complicated process, the rotary vibration of the engine will be described for the purpose of this invention by denoting the rotary vibromotive force about the crank shaft 12 by MZ. In actual practice, however, the pressure applied by the piston exerts influences on the rotary vibration of the engine. However, these influences are excluded from the rotary vibromotive force MZ as hereinafter to be described.

Figure 3:
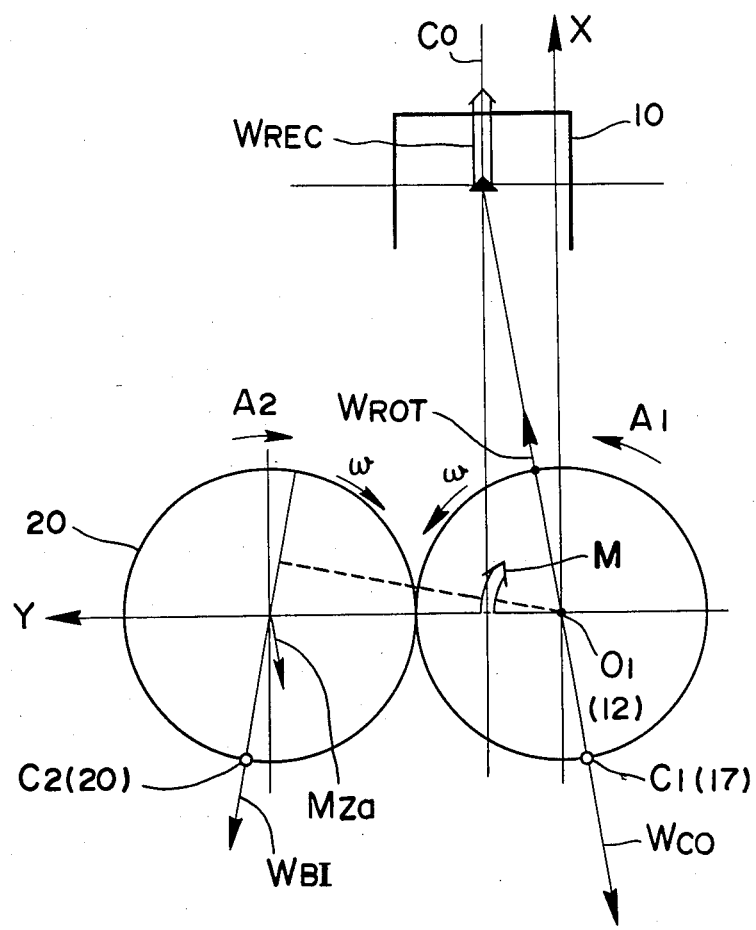
FIG. 3 is a view showing the relation of forces acting in the engine shown in FIG. 2.

Referring to FIG. 3, the rotation of the single primary balancer 20 produces a moment of inertia $M_{za}$ about the crank shaft 12. However, since the center line $C_0$ of the cylinder 11 deviates toward the single primary balancer 20 with respect to the center $O_1$ of rotation of the crank shaft 12, a reciprocating weight $W_{REC}$ of the piston 10 produces a moment M about the crank shaft 12 which cancels out the first-mentioned moment $M_{za}$, thereby greatly reducing the rotary vibromotive force MZ. Stated differently, the rotary vibration about the crank shaft 12 is reduced. In FIG. 3, $W_{ROT}$, $W_{CO}$ and $W_{BI}$ denote a rotary weight, a balance weight of the counterbalancer and a balance weight of the single primary balancer 20, respectively.

Figure 1:
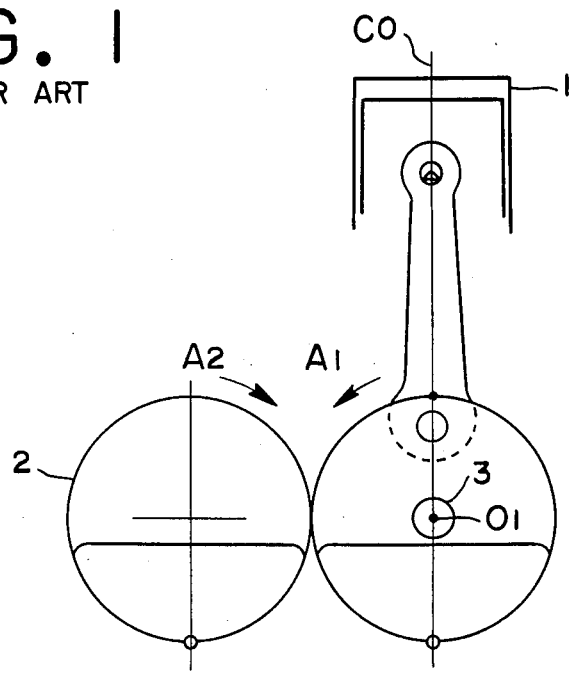
FIG. 1 is a schematic vertical sectional view of a single-cylinder engine having an engine balancing system of the prior art.

If the center line $C_0$ of the cylinder 11 did not deviate toward the single primary balancer 20 from the center $O_1$ of rotation of the crank shaft 12 as is the case with the engine of the prior art shown in FIG. 1, the rotary vibromotive force about the crank shaft 12 would be equal to the moment of inertia $M_{za}$ about the crank shaft 12 produced by the single primary balancer 20 shown in FIG. 3. The rotary vibromotive force $M_{za}$ produced in the engine of the prior art and a rotary vibromotive force $M_{zb}$ produced about the crank shaft 12 when the center line $C_0$ of the cylinder 11 deviates toward the single primary balancer 20 from the center of rotation of the crank shaft 12 are expressed by equations as follows:

$$Mza = W_{BI} \times Rw^2\cos\theta/g \times (Y_1 + R_{BI}\sin\theta) -$$
$$- W_{BI} \times Rw^2\sin\theta/g \times (-X_1 + R_{BI}\cos\theta)$$

$$Mzb = Mza - M$$
$$= Mza - W_{REC} \times$$
$$Rw^2 \left[ \cos\theta + \{\lambda\cos 2\theta + \sin\theta(\lambda\sin\theta - \epsilon)^3 + \epsilon\sin\theta\}/\{1 - (\lambda\sin\theta - \epsilon)^2\}^{\frac{3}{2}} \right] /g \times E$$

where R: the radius of crank.
$R_{BI}$: the distance between the center of gravity of primary balancer and its center of rotation.
L: the length of connecting rod.
$\alpha$: the connecting rod ratio (R/L).
$\epsilon$: the eccentricity ratio (E/L).
$\theta$: the angle of rotation of crank shaft.
$\delta$: the overbalance ratio.
g: the gravitational acceleration.
$X_1$, $Y_1$: the X, Y coordinates of primary balancer using the center of rotation of crank shaft as the origin.

A comparison of the two equations described hereinabove gives the following:

$$|M_{za}|max > |M_{zb}|max$$

Thus, the equations described hereinabove show that, when the balancing mechanism shown in FIG. 3 is used, the rotational vibromotive force $M_{zb}$ produced about the crank shaft is smaller than the rotational vibromotive force $M_{za}$ produced in the prior art.

Figure 4:
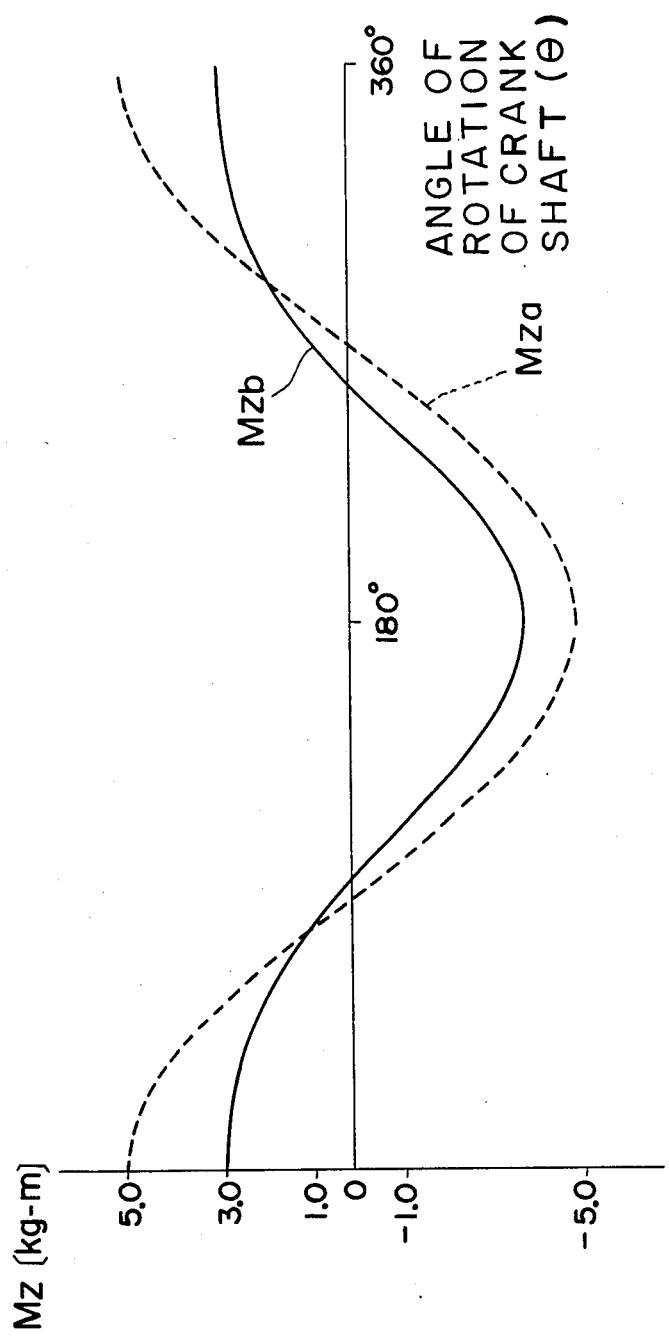
FIG. 4 is a graph showing changes in the rotary vibromotive force acting about the crank shaft.

FIG. 4 is a graph showing the comparison of the rotational vibromotive force $M_{za}$ (broken line) with the rotational vibromotive force $M_{zb}$ (solid line) produced when the balancing mechanism shown in FIG. 3 is used. In FIG. 4, the abscissa represents the crank angle $\theta$ and the ordinate indicates the rotational vibromotive force produced about the crank shaft. The curves representing $M_{za}$ and $M_{zb}$ shown in FIG. 4 are drawn by substituting the following values in the equations described hereinabove: $W_{BI}$=0.155 kg; R=36 mm, $E_{BI}$=13 mm; L=118 mm; $\lambda$=0.305; E=12 mm; $\delta$=0.5; g=9.8 m/sec²; $X_1$=0 mm; $Y_1$=72 mm; $W_{REC}$=0.3 kg; and $W_{ROT}$=0.3865 kg.

Figure 5:
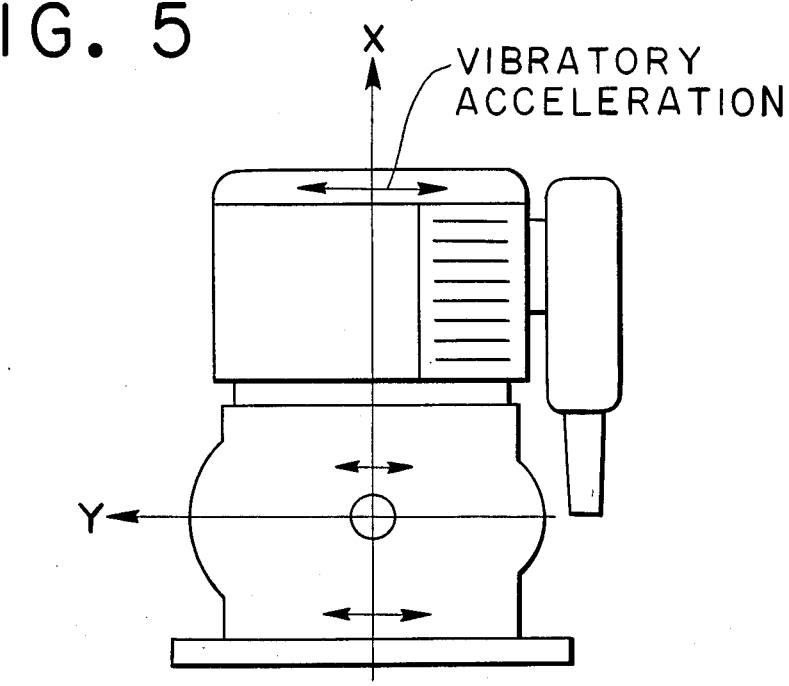
FIG. 5 is a schematic view in explanation of a method of measuring rotary vibration.
Figure 6:
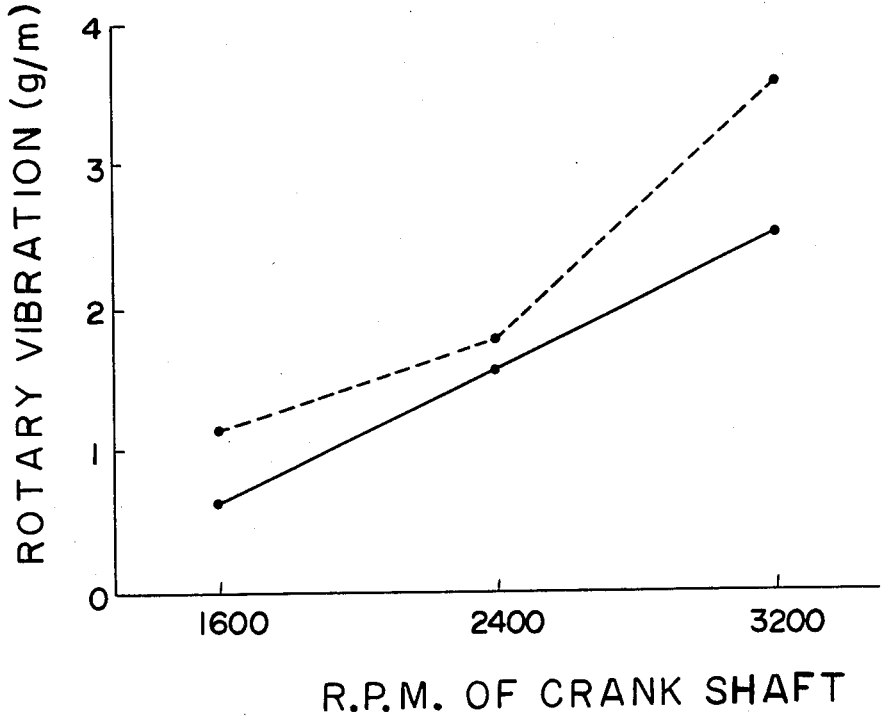
FIG. 6 is a graph showing the results achieved by the method desribed by referring to FIG. 5.
Figure 7:
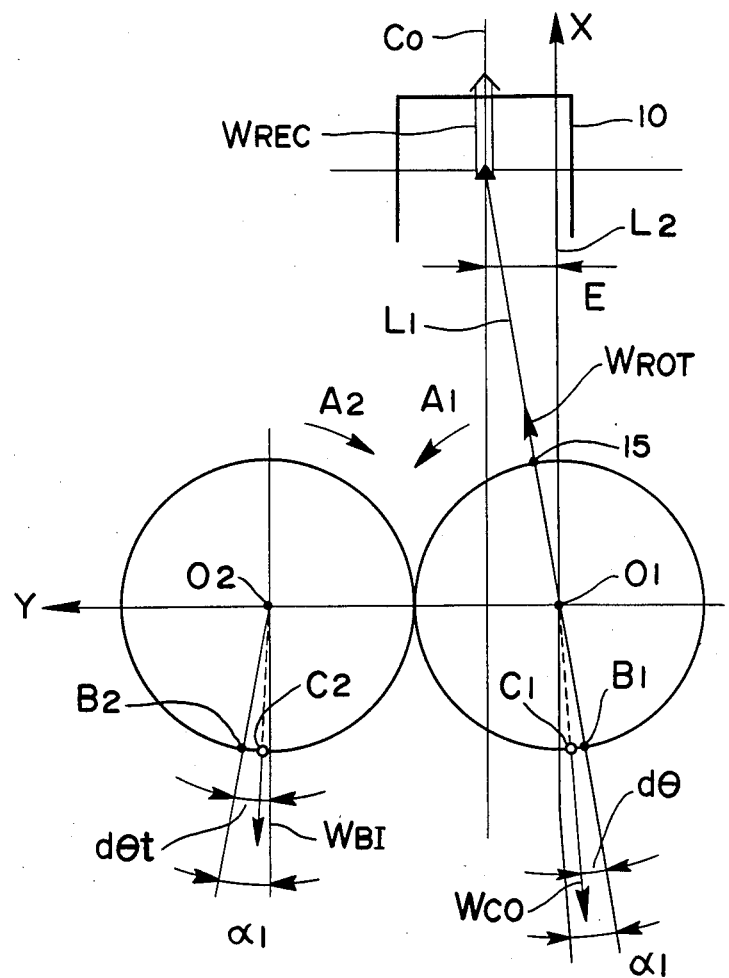
FIG. 7 is a view showing the relation of forces acting in the engine incorporating therein another embodiment of the invention.

Engines incorporating therein the engine balancing system according to the invention were manufactured as samples and they were tested for rotational vibration. It has been ascertained that the rotational vibration is reduced by 13–45% in the engines incorporating the present invention than in engines having the engine balancing system of the prior art. The rotational vibration was determined based on the ratio of the value of a rotational vibration component alone of the transverse acceleration of vibration of an engine measured on a free vibrating table shown in FIG. 5 to the distance from the center of rotation. FIG. 6 shows the results of the tests in which a solid line represents the engines incorporating therein the present invention and a broken line indicates the engines of the prior art. The tests were conducted under the following conditions:

Eccentricity E: 12 mm (the invention) 0 mm (prior art)
Length of Connecting Rod L: 120 mm
Radius of Crank Shaft R: 34 mm
Coordinate of Primary Dynamic Balancer $Y_1$: 67.6 mm
Coordinate of Primary Dynamic Balancer $X_1$: −18 mm FIG. 7 shows another embodiment of the engine balancing system in conformity with the invention, in which the position of the center of gravity $C_1$ of the counterbalancer deviates a suitable distance $d\theta$ from a position $B_1$ which has a phase difference of 180 degrees with respect to the crank pin 15 to a position which is located posterior to the position $B_1$ with respect to the direction of rotation $A_1$ of the crank shaft, and the position of the center of gravity $C_2$ of the single primary balancer is displaced a suitable distance $d\theta_t$ from a position $B_2$ which is symmetrical in phase with the position $B_1$ of 180 degree phase difference with respect to the crank pin 15 to a position which is posterior to the position $B_2$ with respect to the direction of rotation $A_2$ of the single primary balancer.

The center line $C_0$ of the cylinder deviates from the center $O_1$ of rotation of the crank shaft and is displaced by a distance corresponding to an eccentricity E toward the primary balancer. In FIG. 7, parts and weights and positions thereof similar to those shown in FIG. 3 are designated by like reference characters or symbols.

By virtue of the arrangement whereby the center line $C_0$ of the cyliner deviates from the center of rotation of the crank shaft toward the single primary balancer, the rotational vibromotive force $M_z$ produced about the crank shaft is greatly reduced in the embodiment shown in FIG. 7 in the same manner as described by referring to FIG. 3.

In the constructional form of the engine balancing system shown in FIG. 3, the deviation of the center line $C_0$ of the cylinder from the center of rotation of the crank shaft brings the top dead center and bottom dead center out of alignment with each other. This causes forces of inertia to be out of phase with each other, leaving the primary force of inertia unremoved. Thus, the problem with regard to the vibromotive force FX acting in the center line of the cylinder remains unsolved.

In the constructional form of the engine balancing system shown in FIG. 7, the positions of the center of gravity $C_1$ of the counterbalancer and the center of gravity $C_2$ of the primary balancer are displaced from the corresponding positions shown in FIG. 3 to positions posterior thereto with respect to the respective directions of rotations as described hereinabove. This arrangement greatly reduces the vibromotive force FX acting in the direction of the center line of the cylinder as compared with the vibromotive force FX acting in the system shown in FIG. 3. That is, the engine balancing system shown in FIG. 7 is capable of lowering the vibromotive force acting in the direction of the center line of the cylinder to the same level as that prevailing in the engine shown in FIG. 1.

The vibromotive force FXb acting in the direction of the center line of the cylinder in the constructional form of the system shown in FIG. 7 and the vibromotive force FXa acting in the direction of the center line of the cylinder in the system shown in FIG. 1 are expressed by equations as follows:

$$Fxb = W_{REC} \times Rw^2 \left[ \cos\theta + \{\lambda\cos 2\theta + \sin\theta(\lambda\sin\theta - \epsilon)^2 + \epsilon\sin\theta\}/t1 - (\lambda\sin\theta - \epsilon)^2\}^{\frac{3}{2}} \right] /g + W_{ROT} \times Rw^2\cos\theta/g -$$

$$(W_{ROT} + \delta W_{rec}) \times Rw^2\cos(\theta - d\theta)/g -$$

$$\delta W_{REC} \times Rw^2\cos(\theta - d\theta_t)/g$$

$$Fxa = W_{REC} \times Rw^2\cos\theta/g + W_{ROT} \times Rw^2\cos\theta/g -$$

$$(W_{ROT} + \delta W_{REC}) \times Rw^2\cos\theta/g - \delta W_{REC} \times Rw^2\cos\theta/g$$

A comparison of the two equations shows that the following relation holds:

$$|FXb|max \approx |FXa|max$$

in the two equations, the phase adjusting angles $d\theta$ and $d\theta t$ and the overbalance ratio $\delta$ can be obtained by performing a Fourier analysis of the equations dealing with FX and substituting FXa=FXb and FYa=-FYb=0 by using approximate equations while neglecting terms higher than those of the second degree.

Figure 8:
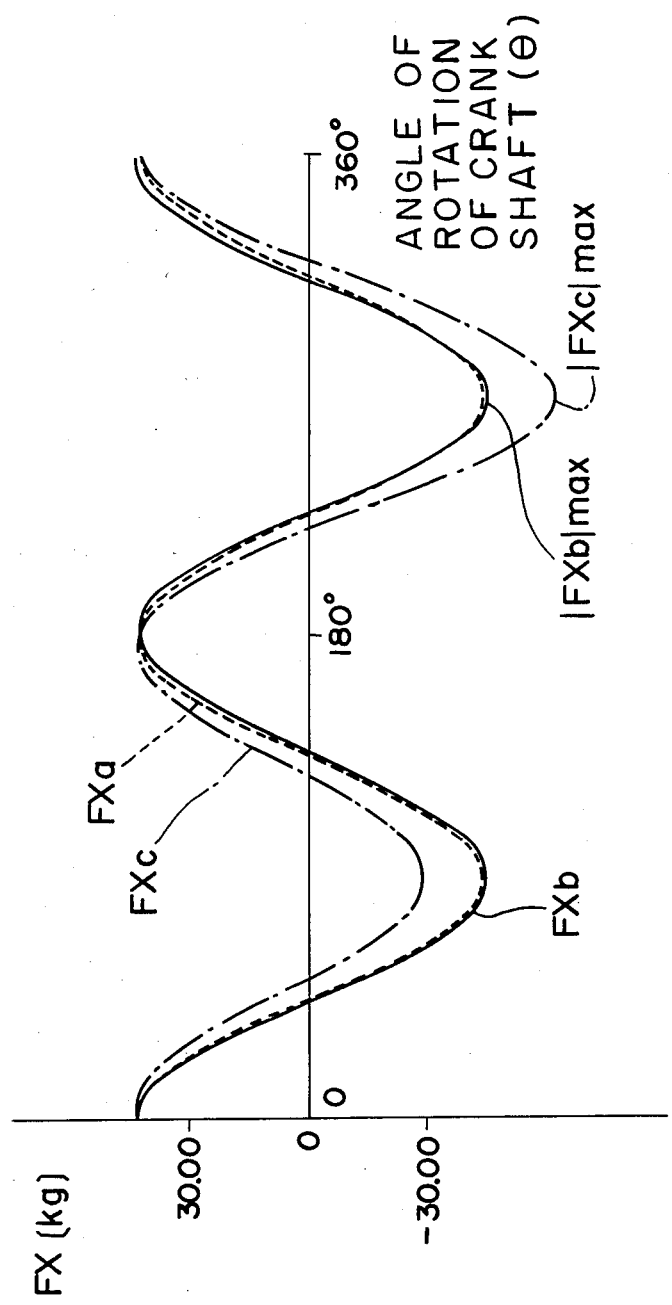
FIG. 8 is a graph showing changes in vibromotive force acting in the direction of a center line of the cylinder.

FIG. 8 shows a comparison of the vibromotive forces FX acting in the direction of the center line of the cylinder. In the graph shown in FIG. 8, a broken line curve, a solid line curve and a dash-and-dot line curve represent a vibromotive force FXa produced in the system shown in FIG. 1, a vibromotive force FXb produced in the system shown in FIG. 7 and a vibromotive force FXc produced in the system shown in FIG. 3, respectively. It will be seen that, although the system shown in FIG. 3 has the problem that $|FXc|max$ is high, it is possible to avoid a rise in $|FXb|max$ in the system shown in FIG. 7.

The vibromotive force FXb has been obtained by setting the phase adjusting angle $d\theta$ of the counterbalance and the phase adjusting angle $d\theta t$ of the primary balancer at 2 degrees and 6.6 degrees, respectively.

The phase adjusting angles $d\theta$ and $d\theta t$ which may also vary depending on the size of the engine, are within the range of an angle $\alpha_1$ as shown in FIG. 7. The angle is formed by an extension of a center line $L_1$ of the connecting rod at the top dead center and a line $L_2$ which extends through the center $O_1$ of rotation of the crank shaft and parallel to the center line $C_0$ of the cylinder. A suitable value is selected for the overbalance ratio $\delta$ depending on the values of the two adjusting angles $d\theta$ and $d\theta t$, to achieve balancing.

What is claimed is:

1. In a single-cylinder engine comprising a crank shaft, a crank web connected to the crank shaft, a connecting rod connected to the crank web through a crank pin, a cylinder, and a piston connected to the connecting rod to move in reciprocatory movement within the cylinder, an engine balancing system comprising:

a counter balancer supported by the crank web; and
   a single primary balancer rotatably supported by a shaft extending parallel to said crank shaft, said single primary balancer being driven to rotate at a velocity equal to that of the counterbalancer in a direction opposite to a direction of rotation of the counterbalancer;
   wherein a center line of the cylinder of the engine deviates from a center of rotation of the crank shaft toward the single primary balancer.

2. An engine balancing system as claimed in claim 1, wherein said counterbalancer supported by the crank web has its center of gravity displaced at a first angle from a first position which differs in phase by 180 degrees from a position of the crank pin to a second position which is posterior to said first position with respect to the direction of rotation of the counterbalancer, and wherein said single primary balancer has its center of gravity displaced at a second angle from a third position, which is symmetrical with said first position of the center of gravity of the counterbalancer with respect to a vertical plane, said vertical plane bisecting an imaginary line connecting the center of the crank shaft to the center of rotation of the single primary shaft and disposed perpendicular thereto, to a fourth position which is posterior to said third position with respect to the direction of rotation of the single primary balancer.

3. An engine balancing system as claimed in claim 2, wherein at least one of the center of gravity of the counterbalancer and the center of gravity of the single primary balancer is located in the range of an angle formed by the longitudinal center line of the connecting rod and a line extending through the center of the crank shaft and parallel to the center line of the cylinder.

* * * * *